United States Patent [19]

Kallfass et al.

[11] Patent Number: 5,240,990

[45] Date of Patent: Aug. 31, 1993

[54] AQUEOUS DISPERSIONS OF FLUORINE-CONTAINING POLYMERS

[75] Inventors: Dietmar Kallfass, Liederbach; Dieter Lämmermann, Hofheim am Taunus; Bernhard Mees, Eppstein/Taunus; Günter Prossel, Burgkirchen, all of Fed. Rep. of Germany

[73] Assignee: Hoechst Aktiengesellschaft, Frankfurt, Fed. Rep. of Germany

[21] Appl. No.: 746,105

[22] Filed: Aug. 15, 1991

[30] Foreign Application Priority Data

Aug. 17, 1990 [DE] Fed. Rep. of Germany ....... 4026097

[51] Int. Cl.$^5$ ................................................. C08J 5/16
[52] U.S. Cl. ..................................... 524/714; 524/186; 524/805
[58] Field of Search .................... 524/805, 714, 186

[56] References Cited

U.S. PATENT DOCUMENTS 4,147,851  4/1979  Raynolds .......................... 526/245

FOREIGN PATENT DOCUMENTS 0294648  12/1988  European Pat. Off. .

*Primary Examiner*—Joseph L. Schofer
*Assistant Examiner*—Peter D. Mulcahy
*Attorney, Agent, or Firm*—Connolly and Hutz

[57] ABSTRACT

Aqueous dispersions of fluorine-containing polymers. The aqueous solvent-free dispersions contain polymers of monomers of the formulae (1) and (2)

$$H_2C=CR-COOC_2H_4-C_nF_{2n+1} \quad (1)$$

where R is fluorine, chlorine, hydrogen or methyl and n is from 5 to 18, $$H_2C=CRX \quad (2)$$

where R is hydrogen or methyl and X is a group of the formula $C_6H_5$, $CO_2CH_2C_6H_5$, $CO_2C_2H_4C_6H_5$, CN, $CO_2CH_2C_6H_4Cl$, $CO_2C_6H_4-C_1-C_4$-alkyl, $CO_2C_2H_{2n+1}$, where n is from 10 to 22, CONHY, where Y is hydrogen, $C_1-C_4$-alkyl, $C_1-C_4$-hydroxyalkyl, $C_1-C_4$-alkoxy-$C_1-C_4$-alkyl or $CO_2-C_1-C_{20}$-alkyl, and one or more emulsifiers of the formula (3)

$$C_nF_{2n+1}-CR^1R^2-CHR^3-(CH_2)_x-NR_2O \quad (3)$$

where R is $C_1-C_4$-alkyl or hydroxyethyl $R^1$ and $R^2$ are identical or different and each is $C_1-C_4$-alkyl, hydrogen or fluorine, $R^3$ is hydrogen or $C_1-C_4$-alkyl, x is 1, 2 or 3 and n is from 3 to 9, and/or of the formula (4)

$$R^1R^2R^3NO \quad (4)$$

where $R^1$ and $R^2$ are identical or different and each is $C_1-C_4$-alkyl or hydrogen and $R^3$ is $C_8-C_{18}$-alkyl.

The dispersions are used as water and oil repellants for textiles.

20 Claims, No Drawings

AQUEOUS DISPERSIONS OF FLUORINE-CONTAINING POLYMERS

The invention relates to aqueous, solvent-free fluorinecontaining dispersions, a process for preparing them, and their use for the fluorochemical treatment of textiles such as carpets, upholsteries and others in order to confer water and oil resistance on them. Polymers having perfluoroalkyl groups are suitable substances for rendering textiles or carpets both hydrophobic and oleophobic, as described for example in EP 345 552, EP 332 141, EP 73364 and US 3,356,628. These polymers are preferably used for technical reasons in the form of aqueous and ideally solvent-free dispersions.

However, the preparation of aqueous, solvent-free dispersions by known emulsion polymerization techniques is difficult, since the perfluoroalkyl monomers are extremely water-insoluble and it is impossible to obtain stable emulsions in water. The addition of organic solvents, for example acetone, to increase the monomer solubility, as described inter alia in U.S. Pat. No. 3,403,122, produces dispersions which are usually coarsely granular and not very stable under storage. For these reasons the perfluoroalkyl monomers are sometimes polymerized in solution, before the polymer obtained is made into a dispersion. This necessarily requires a further operation compared with an emulsion polymerization and, owing to the presence of solvent in the product, has only limited suitability for use. Moreover, the subsequent dispersing of a precipitated fluoropolymer proves expensive in practice.

It has now been found that the use of amine oxide emulsifiers leads to stable aqueous dispersions whose application properties are distinctly superior to those of other systems. The dispersions obtained are notable in particular because they represent stable systems without the addition of organic solvents and in that, owing to the amine oxide emulsifier, they have an almost neutral pH.

The present invention accordingly provides aqueous, solvent-free dispersions of polymers of monomers of the formulae (1) and (2)

$$H_2C=CR-COOC_2H_4-C_nF_{2n+1} \quad (1)$$

where R is fluorine, chlorine, hydrogen or methyl and n is from 5 to 18, preferably from 8 to 12, $$H_2C=CRX \quad (2)$$

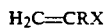

where R is hydrogen or methyl and X is a group of the formula $C_6H_5$, $CO_2CH_2C_6H_5$, $CO_2C_2H_4C_6H_5$, CN, $CO_2CH_2C_6H_4Cl$, $CO_2C_6H_4-C_1-C_4$-alkyl, $CO_2C_nH_{2n+1}$, where n is from 10 to 22, preferably from 14 to 18, CONHY, where Y is hydrogen, $C_1-C_4$-alkyl, $C_1-C_4$-hydroxyalkyl, $C_1-C_4$-alkoxy-$C_1-C_4$-alkyl or $CO_2-C_1-C_{20}$-alkyl, preferably $CO_2-C_2-C_8$-alkyl, and one or more emulsifiers of the formula (3)

$$C_nF_{2n+1}-CR^1R^2-CHR^3-(CH_2)_x-NR_2O \quad (3)$$

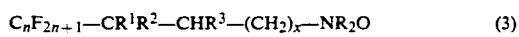

where R is $C_1-C_4$-alkyl or hydroxyethyl, $R^1$ and $R^2$ are identical or different and each is $C_1-C_4$-alkyl, hydrogen or fluorine, $R^3$ is hydrogen or $C_1-C_4$-alkyl, x is 1, 2 or 3 and n is from 3 to 9, preferably from 5 to 7, and/or of the formula (4)

$$R^1R^2R^3NO \quad (4)$$

where $R^1$ and $R^2$ are identical or different and each is $C_1-C_4$-alkyl or hydrogen and $R^3$ is $C_8-C_{18}$-alkyl, preferably $C_{10}-C_{14}$-alkyl.

The proportion of fluorine-free comonomer of the formula (2) in the polymers can be up to 50 percent by weight.

The emulsifiers used are preferably compounds of the formula (3) where $R^1$ and $R^3$ are each hydrogen, $R^2$ is fluorine, R is $C_1-C_4$-alkyl or $CH_2CH_2OH$, n is from 3 to 9 and x is from 1 to 3, which can be present mixed with up to 30 percent by weight, based on the mixture, of a compound of the formula (3) where $R^1$, $R^2$ and $R^3$ are each hydrogen, R is $C_1-C_4$-alkyl or $CH_2CH_2OH$, n is from 3 to 9 and x is from 1 to 3. Suitable emulsifiers of the formula (3) are in particular those compounds where $R^1$ and $R^3$ are each hydrogen, $R^2$ is fluorine, R is methyl or ethyl, n is from 5 to 7 and x is 1 or 2, which can be present mixed with up to 30 percent by weight, based on the mixture, of a compound of the formula (3) where $R^1$, $R^2$ and $R^3$ are each hydrogen, R is methyl or ethyl, n is from 5 to 7 and x is 1 or 2.

The emulsifiers of the formulae (3) and (4) can be used mixed with co-emulsifiers of the formula (5)

$$C_nH_{2n+1}-C_6H_4-O-(C_2H_4O)_mH \quad (5)$$

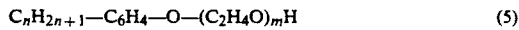

where n is from 4 to 16, preferably from 8 to 10, and m is from 10 to 30, preferably from 18 to 26, and/or co-emulsifiers of the formula (6)

$$C_nH_{2n+1}-O-(C_2H_4O)_mH \quad (6)$$

where n is from 10 to 22, preferably from 13 to 18, and m is from 4 to 12, preferably from 7 to 9.

To achieve the technical purpose, the emulsifiers of the formulae (3) and (4) can each be used alone or mixed with one another in any desired mixing ratio. For the stability of the dispersions it is advantageous if up to 50 percent by weight of the emulsifiers of the formulae (3) and/or (4) is replaced by one or more co-emulsifiers of the formulae (5) and (6).

The total amount of emulsifier, based on the total amount of monomer, should be 5–30 percent by weight, preferably 10–15 percent by weight.

To prepare the aqueous dispersions of the present invention the preferred procedure is to admix the monomer mixture with the emulsifiers and any co-emulsifiers and add sufficient water as to produce for the dispersions a fluorine content of 10–30 percent by weight, based on the total dispersion, from the fluorine contents of the monomers and the added emulsifiers together. The mixture is in general stirred at 50° C. under nitrogen for 30 minutes and then a water-soluble free radical initiator customary for an emulsion polymerization, for example azodiisobutyramidine dihydrochloride, is added as catalyst. After heating for example to 50°–60° C. for several hours (see Table 1) the dispersion is stirred without further heating until back at room temperature.

The aqueous dispersions of the present invention are suitable for treating textiles made of natural or synthetic fibers, in particular polyamide, polyester, polyacrylonitrile and wool or blends of these fibers. The textile material can be present in any desired form, for example as tow, loose fiber, yarn, knitted fabric or nonwoven but in particular as woven fabric. The aqueous dispersions of the present invention can be applied to the textile material in the as-prepared form. Customarily, however, they are diluted with water to a solids content of 0.1–10% by weight, preferably 1–5% by weight, before use. Application to the textile material to be treated can take the form of spraying, nip padding, slop padding, etc. The amount applied is such that 0.01–1% by weight of fluorine, preferably 0.03–0.2% by weight of fluorine, ends up on the textile material. After application, the textile material is dried at temperatures of up to about 120° C. and is then subjected at temperatures of about 130°–190° C., preferably 140°–180° C., to a heat treatment which customarily takes from about 20 seconds to 5 minutes. While the amine oxides of the formulae (3) and (4) remain stable in the preparation of the aqueous dispersions of the present invention, at the temperatures of above 120° C. necessary for fixing the dispersions on the textile fiber they decompose virtually quantitatively (differential thermal gravimetry), which is particularly beneficial for the oil and water repellancy. Since the decomposition products of the emulsifiers used according to the present invention are largely gaseous, they consequently do not interfere with the application through yellowing which might be caused by secondary reactions of the decomposition products.

The fluorine-containing, aqueous polymer dispersions prepared according to the present invention show excellent oil and water repellant effects in textile finishing not only in respect of washing but also in respect of drycleaning resistance. They can be used as a textile finish either alone or combined with other finishes, such as crosslinkers or softeners.

TABLE 1

Preparation Examples:

| Example No. | Fluoro monomer | Comonomers | Emulsifiers | Initiator | Temp (°C.) | Precipitation (% of TM) |
|---|---|---|---|---|---|---|
| 1 | 40 g of AAE | 0.75 g of ABU<br>16 g of BA | 6 g of B101<br>2 g of N230<br>2 g of X080 | 0.4 g of AB | 60 | 1.3 |
| 2 | 40 g of AAE | 0.75 g of ABU<br>14 g of Ba<br>0.96 g of NH A | 6 g of B101<br>2 g of N230<br>2 g of X080 | 0.4 g of AB | 60 | 0.02 |
| 3 | 40 g of AAE | 0.75 g of ABU<br>14 g of BA<br>2.0 g AA | 6 g of B101<br>2 g of N230<br>2 g of X080 | 0.4 g of AB | 60 | 0.5 |
| 4 | 40 g of AAE | 0.75 g of ABU<br>14 g of BA<br>2.0 g of AN | 6 g of B101<br>2 g of N230<br>2 g of X080 | 0.4 g of AB | 60 | 0.3 |
| 5 | 40 g of AAE | 2.0 g of ABU<br>15 g of BA | 6 g of B101<br>2 g of N230<br>2 g of X080 | 0.4 g of AB | 60 | 1.1 |
| 6 | 40 g of AAE | 0.75 g of ABU<br>14 g of BA<br>2.0 g of IBMA | 6 g of B101<br>2 g of N230<br>2 g of X080 | 0.4 g of AB | 60 | 0.2 |
| 7 | 41.6 g of AAE | 0.63 g of ABU<br>0.4 g of LA | 9 g of B101<br>4 g of N230 | 0.7 g of AB | 50 | 1.2 |
| 8 | 40 g of AAE | 0.75 g of ABU<br>14 g of BA<br>0.96 g NHMA | 12 g of B101 | 0.4 g of AB | 60 | 0.1 |
| 9 | 41.6 g of AAE | 0.63 g of ABU<br>0.96 g of NHMA<br>0.4 g of LA | 9 g of B101 | 0.7 g of AB | 50 | 0.5 |
| 10 | 40 g of AAE | 14 g of BA<br>0.75 g of ABU<br>0.96 g of NHMA | 10 g of DMDA | 0.4 g of AB | 60 | 0.9 |
| 11 | 40 g of AAE | 14 g of BA<br>0.75 g of ABU<br>0.96 g of NHMA | 6 g of DMDA<br>4 g of B101 | 0.4 g of AB | 60 | 0.7 |
| 12 | 40 g of AAE | 14 g of BA<br>0.75 g of ABU<br>0.96 g of NHMA | 6 g of CC<br>4 g of B101 | 0.4 g of AB | 60 | 0.1 |
| 13 | 40 g of AAE | 10 g of BA<br>0.75 g of ABU<br>2.88 g of NHMA | 6 g of B101<br>2 g of X080<br>2 g of N230 | 0.4 g of AB | 60 | 0.1 |
| 14 | 40 g of AAE | 14 g of BA<br>0.75 g of ABU<br>0.96 g of NHMA | 4 g of B101<br>6 g of HN1 | 0.4 g of AB | 60 | 0.5 |
| 15 | 40 g of AAE | 14 g of BA<br>0.75 g of ABU<br>0.96 g of NHMA | 4 g of B101<br>6 g of HN9 | 0.4 g of AB | 60 | 0.5 |
| 16 | 40 g of AAE | 10 g of BA<br>0.75 g of ABU<br>2.88 g of NHMA | 12 g of B101 | 0.4 g of AB | 60 | 5.8 |
| 17 | 40 g of AAE | 8 g of BA<br>0.75 g of ABU<br>0.96 g of NHMA<br>6 g of P-Cl | 12 g of B101 | 0.4 g of AB | 60 | 0.3 |
| 18 | 21.6 g of AAE<br>20 g of MAE | 0.63 g of ABU<br>0.96 g of NHMA<br>0.4 g of LA | 9 g of B101 | 0.7 g of AB | 50 | 0.3 |
| 19 | 40 g of AAE | 16 g of BA<br>0.75 g of ABU | 6 g of CAT1<br>2 g of N230<br>2 g of X080 | 0.4 g of AB | 60 | 1.1 |
| 20 | 40 g of AAE | 16 g of BA<br>0.75 g of ABU | 6 g of CAT2<br>2 g of N230 | 0.4 g of AB | 60 | 5.4 |

TABLE 1-continued

Preparation Examples:

| Example No. | Fluoro monomer | Comonomers | Emulsifiers | Initiator | Temp (°C.) | Precipitation (% of TM) |
|---|---|---|---|---|---|---|
| 21 | 40 g of AAE | 16 g of BA<br>0.75 g of ABU | 2 g of X080<br>6 g of CAT3<br>2 g of N230<br>2 g of X080 | 0.4 g of AB | 60 | 1.7 |

Component 1: 3 g of a 50% strength aqueous solution of highly methanol-etherified melaminemethylol
Component 2: 6 g of a 25% strength aqueous zinc nitrate solution, 1 ml of 60% strength acetic acid
Component 3: 6 g or 12 g of a commercial approximately 25% strength water repellant ( ® NUVA FH)

Comparative Example 22 contains as emulsifier a compound of the formula $$C_6F_{13}-(CH_2)_2-O-CONH-(CH_2)_2-S-SO_3Na.$$

Compared with the emulsifiers to be used according to the present invention, this compound has the disadvantage that it only fully decomposes at temperatures above 250° C. Moreover, the fluorine-containing component 3 can be used only together with a melamine resin and a zinc nitrate solution. This disadvantage disappears with the dispersions prepared according to the present invention.

GM=total monomer, AAE=acrylic acid ethylperfluoroalkyl ester mixture of the approximate composition:

4-6% of $C_6F_{13}CH_2CH_2OCOCH=CH_2$
48-58% of $C_8F_{17}CH_2CH_2OCOCH=CH_2$
8-13% of $C_{10}F_{21}CH_2CH_2OCOCH=CH_2$
2-4% of $C_{12}F_{25}CH_2CH_2OCOCH=CH_2$
0.3-1.2% of $C_{14}F_{29}CH_2CH_2OCOCH=CH_2$

MAE=methacrylic acid ethylperfluoroalkyl ester mixture 0f the approximate composition:

0-1% of $C_6F_{13}CH_2CH_2OCOC(CH_3)=CH_2$
0.4-1.4% of $C_8F_{17}CH_2CH_2OCOC(CH_3)=CH_2$
38-42% of $C_{10}F_{21}CH_2CH_2OCOC(CH_3)=CH_2$
31-36% of $C_{12}F_{25}CH_2CH_2OCOC(CH_3)=CH_2$
12-16% of $C_{14}F_{29}CH_2CH_2OCOC(CH_3)=CH_2$
2-6% of $C_{16}F_{33}CH_2CH_2OCOC(CH_3)=CH_2$

BA=benzyl acrylate; ABU=acryloylbutylurethane;
NHMA=N-hydroxymethylacrylamide;
IBMA=N-hydroxymethylacrylamide isobutyl ether;
LA=lauryl acrylate; AA=acrylamide; AN=acrylonitrile;
P-Cl=para-chlorobenzyl acrylate;
AB=azodiisobutyramidine dihydrochloride;
B101=$C_5F_{11}CHFCH_2CH_2N(CH_3)_2O$;
N230=nonylphenol condensed with 23 EO;
X080=isotridecyl alcohol condensed with 8 EO;
DMDA=N,N-dimethyldodecylamine N-oxide;
CC=cocoalkyldimethylamine N-oxide;
HN1=$C_{8-10}H_{17-21}N(CH_3)_2O$;
HN9=$C_{12}H_{25}N(CH_3(C_4H_9)O$;
CAT1=$C_nF_{2n+1}CH_2CH_2OCOCH_2CH_2N(C_4H_9)_2xHCl$ where n=4-12;
CAT2=$C_{6-12}F_{13-25}(C_2H_4O)_{16}H$;
CAT3=$C_6F_{13}CH_2CH_2SSO_3Na$.

Application testing of the aqueous fluorine-containing polymer dispersions and comparative examples:

The dispersions of Examples 1, 2 and 18 of the present invention were tested plus for comparison the dispersions 19 to 22.

The finishing liquors were made up in such a way that their fluorine contents were constant and that a predetermined wet pickup after squeezing would produce a defined fluorine add-on on the fabrics to be treated.

The test results in Table 2 were produced with a polyamide taffeta fabric by way of example. In each case the test was carried out as follows:

The polyamide taffeta fabric to be tested was impregnated, squeezed off to a residual level of 50%, dried at 110° C. and heated at 150° C. for three minutes to effect condensation. The fluorine add-on on the fabrics was thus about 0.05% by weight or 0.1% by weight.

The water and oil repellancy effects measured on this polyamide taffeta fabric are summarized below in Table 2.

TABLE 2

| Test | Example 18 | | Example 1 | | Example 2 | | Example 19 | | Example 20 | | Example 21 | | Example 22 | |
|---|---|---|---|---|---|---|---|---|---|---|---|---|---|---|
| Fluorine add-on (ppm) | 500 | 1000 | 500 | 1000 | 500 | 1000 | 500 | 1000 | 500 | 1000 | 500 | 1000 | 500 | 1000 |
| Water repellancy Spray test (AATCC 22) | | | | | | | | | | | | | | |
| At the beginning | 100 | 100 | 90 | 100 | 100 | 100 | 70 | 100 | 90 | 90 | 70 | 80 | 100 | 100 |
| after 3× washing at 60° C. | 80 | 100 | 50 | 50 | 70 | 70 | 0 | 0 | 0 | 0 | 0 | 0 | 70 | 80 |
| after 3× drycleaning | 100 | 100 | — | — | — | — | — | — | — | — | — | — | 100 | 100 |
| Oil repellancy Test in accordance with AATCC 118 | | | | | | | | | | | | | | |
| At the beginning | 6 | 6 | 5 | 6 | 6 | 7 | 5 | 6 | 5 | 6 | 2 | 3 | 5 | 6 |
| after 3× washing at 60° C. | 2 | 4 | 1 | 2 | 4 | 4 | 0 | 1 | 0 | 0 | 0 | 0 | 3 | 4 |
| after 3× drycleaning | 6 | 6 | — | — | — | — | — | — | — | — | — | — | 5 | 6 |

What is claimed is:

1. An aqueous, solvent-free dispersion of a polymer comprising monomers of the formulae (1) and (2)

$$H_2C=CR-COOC_2H_4-C_nF_{2n+1} \qquad (1)$$

where R is fluorine, chlorine, hydrogen or methyl and n is from 5 to 18, $$H_2C=CRX \qquad (2)$$

wherein R is hydrogen or methyl and X is a group of the formula $C_6H_5$, $CO_2CH_2C_6H_5$, $CO_2C_2H_4C_6H_5$, CN, $CO_2CH_2C_6H_4Cl$, $CO_2C_6H_4-C_1-C_4$-alkyl, $CO_2C_nH_{2n+1}$, where n is from 10 to 22, CONHY, where Y is hydrogen, $C_1-C_4$-alkyl, $C_1-C_4$-hydroxyalkyl, $C_1-C_4$-alkoxy-$C_1-C_4$-alkyl or $CO_2-C_1-C_{20}$-alkyl, and one or more emulsifiers of the formula (3)

$$C_nF_{2n+1}-CR^1R^2-CHR^3-(CH_2)_x-NR_2O \qquad (3)$$

where R is $C_1-C_4$-alkyl or hydroxyethyl, $R^1$ and $R^2$ are identical or different and each is $C_1-C_4$-alkyl, hydrogen or fluorine, $R^3$ is hydrogen or $C_1-C_4$-alkyl, x is 1, 2 or 3, and n is from 3 to 9, or of the formula (4)

$$R^1R^2R^3NO \qquad (4)$$

wherein $R^1$ and $R^2$ are identical or different and each is $C_1-C_4$-alkyl or hydrogen and $R^3$ is $C_8-C_{18}$-alkyl or a mixture of one or more emulsifiers of the formulae (3) an (4).

2. A dispersion as claimed in claim 1, containing as emulsifier only a compound of the formula (3).

3. A dispersion as claimed in claim 1, containing a compound of the formula (3)

$$C_nF_{2n+1}-CR^1R^2-CHR^3-(CH_2)_x-NR_2O \qquad (3)$$

where $R^1$ and $R^3$ are each hydrogen, $R^2$ is fluorine, R is $C_1-C_4$-alkyl or $CH_2CH_2OH$, n is from 3 to 9 and x is from 1 to 3, optionally mixed with up to 30 percent by weight, based on the mixture, of a compound of the formula (3) where $R^1$, $R^2$ and $R^3$ are each hydrogen, R is $C_1-C_4$-alkyl or $CH_2CH_2OH$, n is from 3 to 9 and x is from 1 to 3, as emulsifier.

4. A dispersion as claimed in claim 1, containing a compound of the formula (3)

$$C_nF_{2n+1}-CR^1R^2-CHR^3-(CH_2)_x-RN_2O \qquad (3)$$

where $R^1$ and $R^3$ are each hydrogen, $R^2$ is fluorine, R is methyl or ethyl, n is from 5 to 7 and x is 1 or 2, optionally mixed with up to 30 percent by weight, based on he mixture of a compound of the formula (3) where $R^1$, $R^2$ and $R^3$ are each hydrogen, R is methyl or ethyl, n is from 5 to 7 and x is 1 or 2, as emulsifier.

5. A dispersion as claimed in claim 1, wherein an amount up to 50 percent by weight of the emulsifier of the formula (3) or (4) are replaced by one or more co-emulsifiers of the formula (5)

$$C_nH_{2n+1}-C_6H_4-)-(C_2H_4O)_mH \qquad (5)$$

where n is from 4 to 16, and m is from 10 to 30, or of the formula (6)

$$C_nH_{2n+1}-O-(C_2H_4O)_mH \qquad (6)$$

where n is from 10 to 20, and m is from 4 to 12 or a mixture of one or more emulsifiers of the formula (3), (5) and (6).

6. A dispersion as claimed in claim 1, wherein the total amount of emulsifier, based on a total amount of monomer, is 5–30 percent by weight.

7. A dispersion according to claim 1 having a fluorine content, based on the total dispersion, of 10–30 percent by weight.

8. A process for producing a dispersion as claimed in claim 1, which comprises dispersing monomers of the formulae (1) and (2) in the presence of emulsifiers of the formulae (3), (4), (5) or (6) or a mixture of one or more emulsifiers of the formulae (3), (4), (5) and (6) in water and reacting to produce said dispersion.

9. A water and oil repellant for textiles comprising a dispersion as claimed in claim 1.

10. A dispersion as claimed in claim 1, wherein n from formula (1) is from 8 to 12.

11. A dispersion as claimed in claim 1, wherein n from formula (2) is from 14 to 18 and Y is $CO_2-C_2-C_8$-alkyl.

12. A dispersion as claimed in claim 1, wherein n from formula (3) is from 5 to 7.

13. A dispersion as claimed in claim 1, wherein $R^3$ from formula (4) is $C_{10}-C_{14}$-alkyl.

14. A dispersion as claimed in claim 5, wherein n form formula (5) is from 8 to 10 and m from formula (5) is from 18 to 26.

15. A dispersion as claimed in claim 5, wherein n from formula (6) is from 13 to 18 and m from formula (6) is from 7 to 9.

16. A dispersion as claimed in claim 6, wherein the total amount of the emulsifier, based on the total amount weight of the monomer is 10–15% by weight.

17. A dispersion as claimed in claim 1, wherein the emulsifier of formula III has $R^1$ and $R^3$ each as hydrogen, $R^2$ is fluorine, R is $C_1-C_4$-alkyl or $CH_2CH_2OH$, n is from 3 to 9 and x is from 1 to 3.

18. The process as claimed in claim 8, further requiring the process to be initiated by a water-soluble free radical initiator.

19. The process as claimed in claim 18, wherein said free radical initiator is azodiisobutyramidine dihydrochloride.

20. The water and oil repellant as claimed in claim 9, wherein said dispersion is diluted with water to a solids content of 0.1–10% by weight.

* * * * *